Aug. 8, 1967 H. W. SARGENT, JR., ETAL 3,335,421
SUBSCRIPTION TELEVISION CONTROL METER
Filed June 11, 1964 4 Sheets-Sheet 1

INVENTORS
HORACE W. SARGENT, Jr.
GAYLORD H. WOTRING
DONALD L. HAAG

INVENTORS
HORACE W. SARGENT, Jr.
GAYLORD H. WOTRING
DONALD L. HAAG

SUBSCRIPTION TELEVISION CONTROL METER

Filed June 11, 1964

HORACE W. SARGENT JR.
GAYLORD H. WOTRING
DONALD L. HAAG
INVENTORS.

BY

Townsend and Townsend

Aug. 8, 1967 H. W. SARGENT, JR., ETAL 3,335,421

SUBSCRIPTION TELEVISION CONTROL METER

Filed June 11, 1964

4 Sheets-Sheet 4

HORACE W. SARGENT JR.
GAYLORD H. WOTRING
DONALD L. HAAG

INVENTORS.

BY

Townsend and Townsend 3,335,421
Patented Aug. 8, 1967

1

3,335,421
SUBSCRIPTION TELEVISION CONTROL METER
Horace W. Sargent, Jr., San Marino, Calif., and Gaylord H. Wotring, Morrison, and Donald L. Haag, Sterling, Ill., assignors to Subscription Television, Inc.
Filed June 11, 1964, Ser. No. 381,941
7 Claims. (Cl. 346—37)

This invention relates to a subscription television system and more particularly to a device for giving effect to a subscriber's selection and to providing a permanent record of the selection.

The present application describes a part of the subject matter of co-pending U.S. patent application, Ser. No. 106,800, filed May 1, 1961, now Patent No. 3,234,560, and is an improvement thereover.

The advent of subscription television systems of a variety of forms has focused new attention on various meters for recording or storing information relative to the selection and charging for the pay television programs. For the various pay television systems proposed, different types of billing arrangements have been suggested. In one particular type proposed, a coin demand system, the charging and billing apparatus includes a device responsive to the deposit of selected coins therein to generate a proper signal and connect it to the system proper when the correct charge has been made. This acts to unscramble the garbled radiowave transmission signals. In other systems, various billing procedures have been visualized, many of which use mechanical apparatus or type mechanisms to provide records of the subscriber's selections for billing purposes.

In my co-pending application filed on an even date herewith, which discloses a pay television system wherein a plurality of pay television channels are transmitted over a closed wire system at subcarrier frequencies for selective conversion to an open channel in a subscriber's television receiver, the instant meter is briefly described. The pay television system therein disclosed provides a straightforward and simple answer to the demands of competing non-wire systems and yet provides the convenience and economies that make the wire service superior to virtually all non-wire systems that principally depend upon garbling or scrambling the video signals.

The exemplary pay television system which includes the subscription television meter of the present invention provides a preview and two pay television programs. The carrier for these three programs are transmitted in distinct bands over a common cable to all subscribers' receivers. There the individual decoding and selecting apparatus consists basically of a receiver-converter or subscriber system and a meter and charging apparatus, herein denominated as the subscription television meter. The receiver-converter upon selection of one of the three channels by the subscriber through a push button arrangement selects the desired program channel and its carriers and converts them to an open or unused channel in the tuner of the receiver front end. If the channel the subscriber selects is the preview channel, there is no charge made inasmuch as no signal is connected at this time to the subscription television meter. On the other hand, if the subscriber views one of the two pay television channels by actuating an appropriate push button switch, he converts the selected pay channel to the open channel in his own receiver and at the same time provides a signal

2 to the subscription television meter for noting the fact that that particular program was selected for viewing. The rotative position of the charge card associated with the meter on each subscriber's premises is controlled from the main station by a signal carrier which advances the charge card support table for each group of program changes so that unique individual marks are provided each time a particular pay program is selected by a subscriber.

A system in which the present meter is used is disclosed in my copending application, Ser. No. 106,799, filed on May 1, 1961, now Patent No. 3,211,830, to which reference should be made for a more detailed explanation.

Briefly, the present meter comprises a table or platen rotatively positioned by a ratchet mechanism and includes a pair of electromagnetic devices operable individually to uniquely mark a charge card supported on the platen in an indexed position. A stepping relay of the ratchet mechanism is controlled from the main station and is energized each time the programs offered on the pay channels are changed. Thus, each angular position of the charge card is referenced to a particular system offering. The marking devices are individually associated with the two pay program channels so that a selection by a subscriber marks which of a number of offered programs has been selected for viewing.

The principal object of the present invention is to provide a subscription television meter which is economical to manufacture, simple to operate, and requires minimum maintenance.

A further object is to provide a meter that is mounted outside of a subscriber's home and is therefore readily serviced without obtaining access to the subscriber's home.

Another object of the present invention is to provide a subscription television meter which is easily modified to permit expansion of the system through the provision of additional pay television programs.

Another object of the invention is to provide a television meter which is controlled electromagnetically and therefore requires no elaborate memory or other electronic circuits to record information on program selections during the course of a billing period.

A feature of the present invention pertains to the provision of a subscription television meter adapted for use in a variety of commercial or pay television systems.

Another feature of the invention pertains to the use of a simple indexing card for each subscriber station to indicate particular pay programs selected for viewing during the course of a billing period.

Yet another feature of the invention pertains to the means for advancing the card support platen a selected number of angular degrees or an integral number of steps for each revolution of the card. This latter feature is accomplished by controlling the movement of the charge card through the stepping relay energized at the main station.

Still another feature of the invention pertains to the arrangement that permits the meter to be expanded to accommodate more than two pay television channels. This feature is realized by increasing the number of circular grooves in the top of the platen and disposing an equal number of electromagnetically actuated perforating devices above and overlying the circular grooves, each perforating device-groove combination corresponding to one of the pay television program offerings.

Yet another feature of the invention pertains to the use of electromechanical devices to rotate the platen and actuate the perforating devices that identify which pay program is selected for viewing.

Still another feature of the invention pertains to the means cooperating with the stepping relay to prevent loss of the reference relationship between main station signals and the subscribers' meters. This latter feature includes stabilizer and anti-reverse means cooperating with a finger on the stepping relay to prevent reverse rotation of the platen and to limit an advance to one increment at a time.

These and other objects, advantages and features of the present invention may be more fully understood when the following detailed description is read with reference to the drawings in which.

Figure 1:
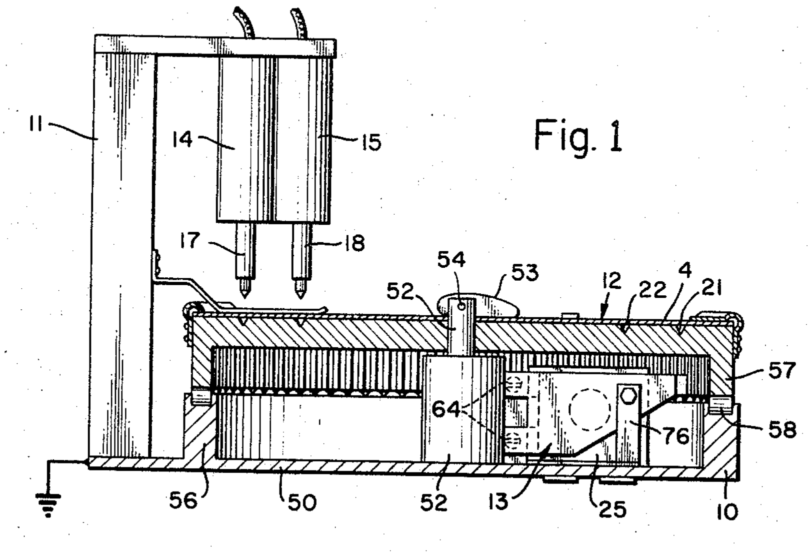
FIG. 1 is a side view of the subscription television meter forming the present invention with certain portions cut away or cross sectioned to more clearly illustrate the cooperative features of the apparatus.
Figure 3:
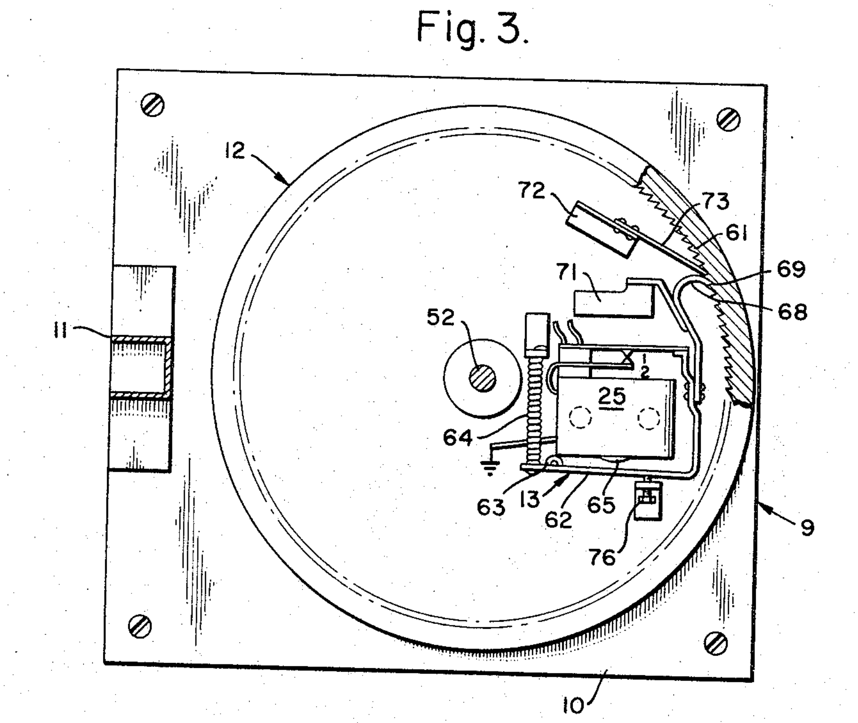
Figure 4:
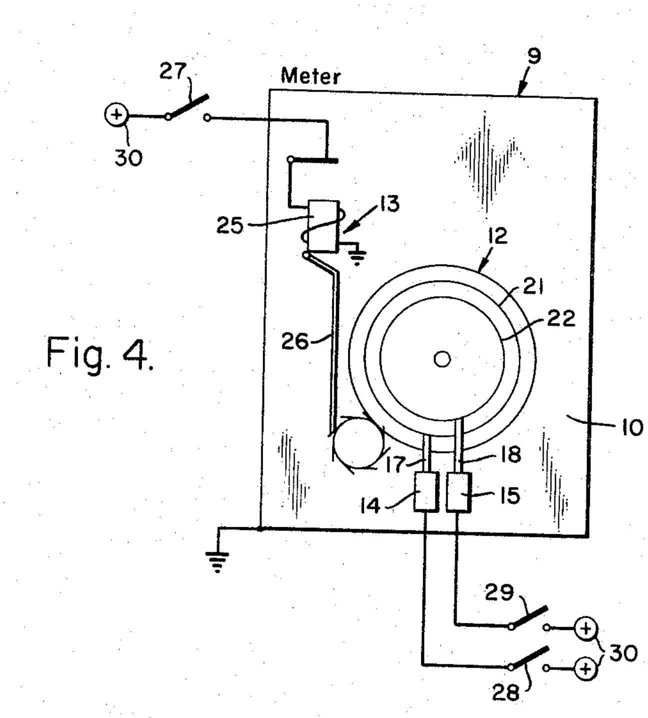

FIG. 3 is a bottom view of the subscription television meter of FIG. 1 with certain parts omitted to illustrate the ratchet mechanism for incrementally rotating the charge card platen; and FIG. 4 is a schematic representation of the pay television meter of the present invention illustrating the input terminals for signals from the main station and receiver-converter switching circuits of the exemplary pay television system of which the meter is a part.

Figures 5, 6, 7A, 7B:
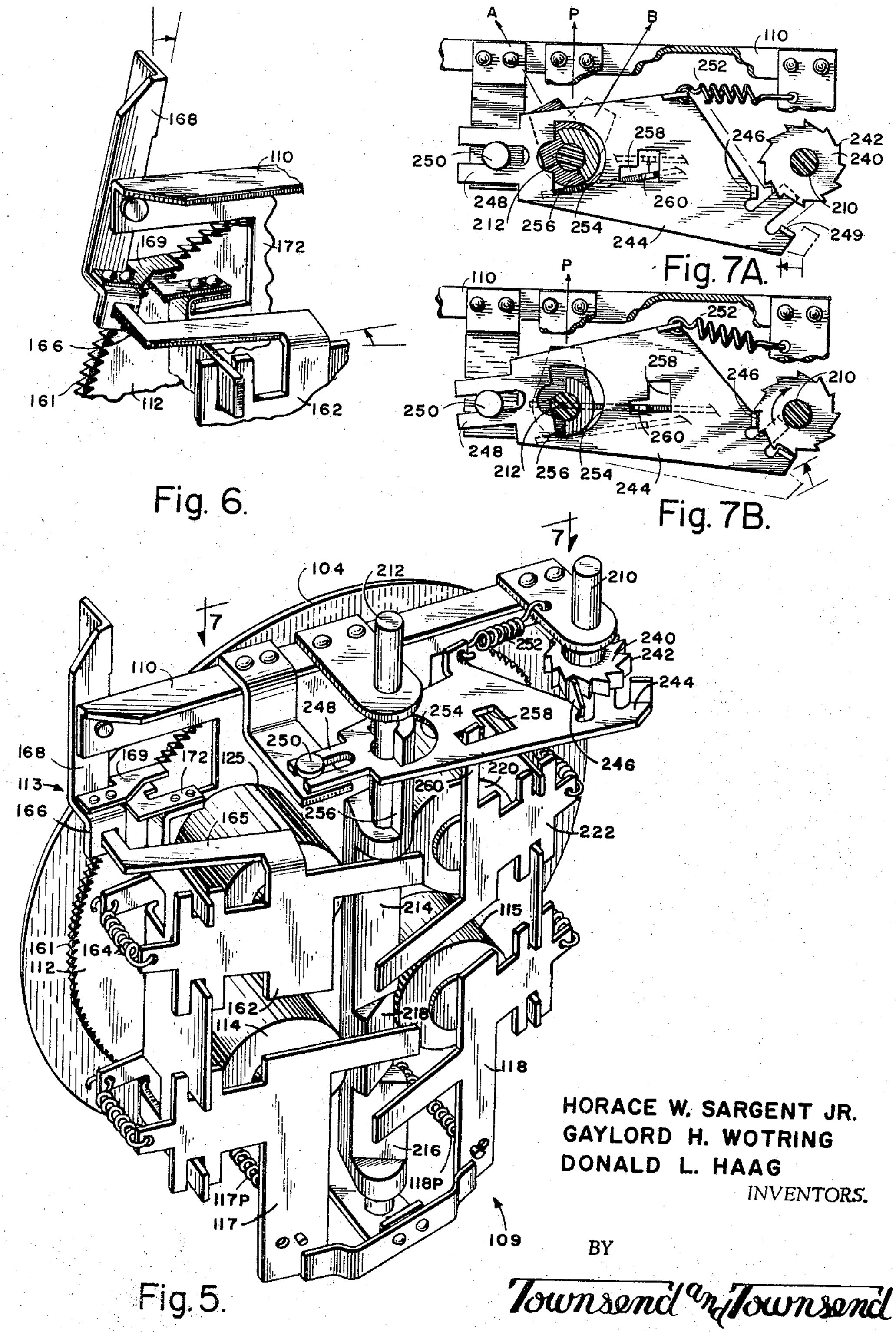

FIG. 5 is a perspective view from the rear of a modified meter according to the invention.

FIG. 6 is a detailed view of the charge card platen advance mechanism of FIG. 5.

Figure 8:
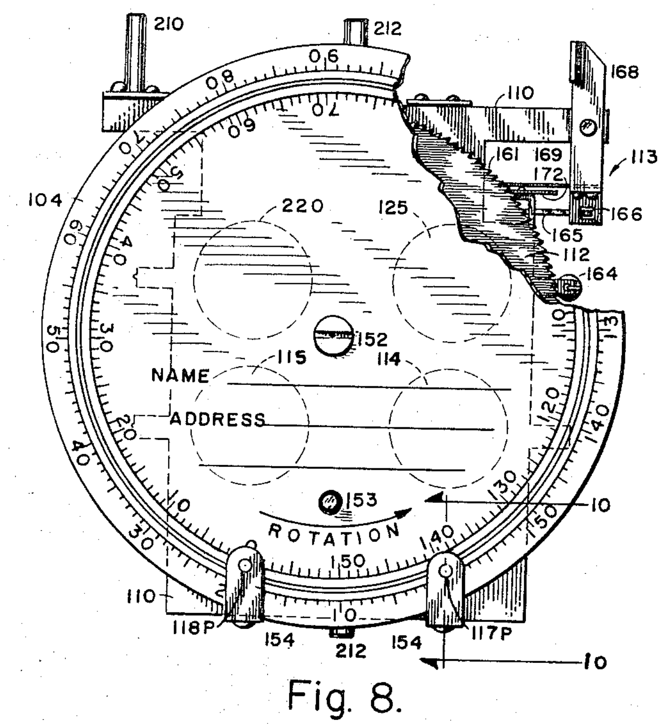
Figure 9:
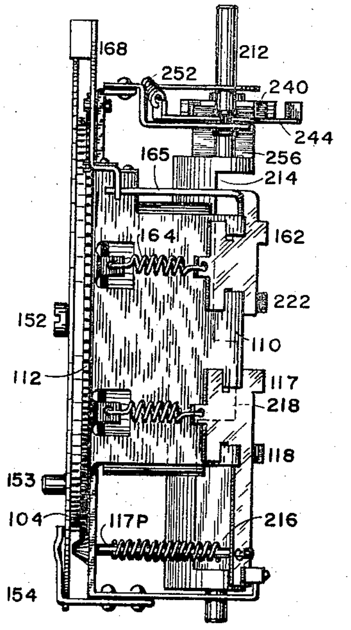
Figures 10, 11:
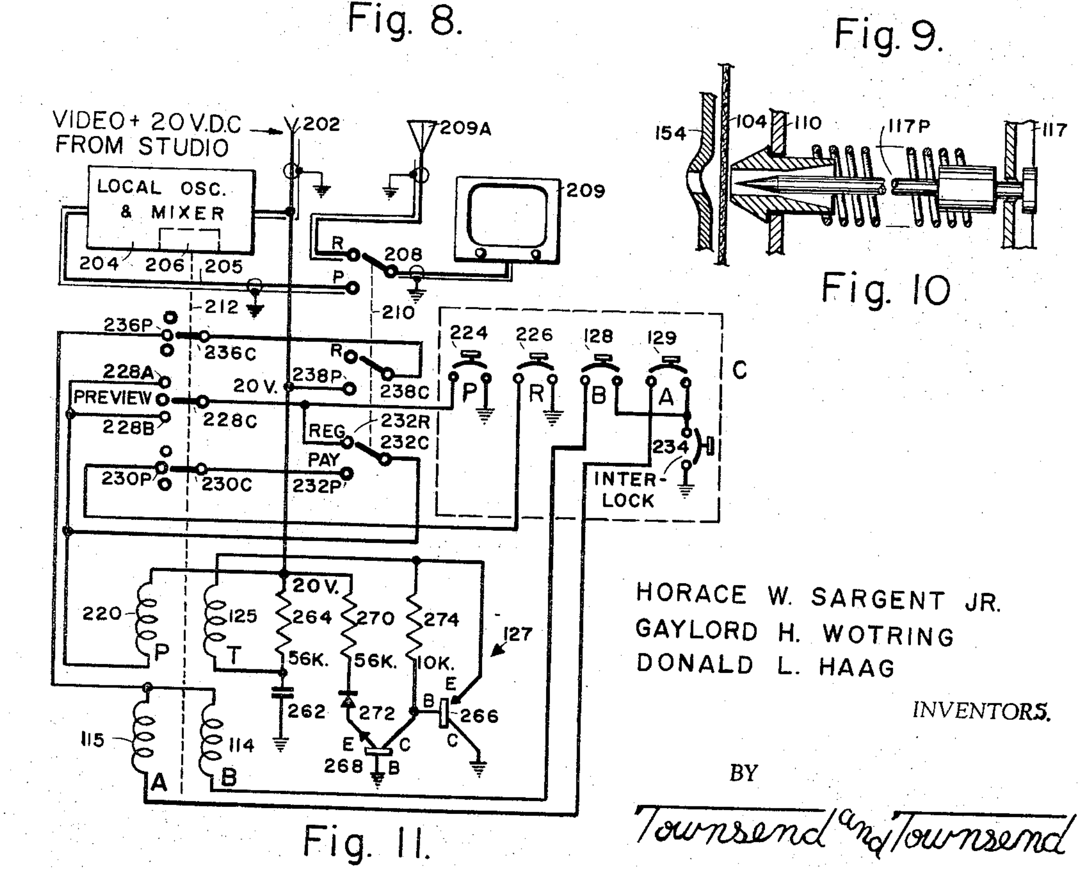

FIGURES 7*a* and 7*b* are detailed views taken along lines 7—7 of FIG. 5 showing a linkage in two positions of operation for controlling connection of the subscribers receiver to either the subscription television system or to the subscribers' home antenna;

FIG. 8 is a front elevation view of the modification of the invention shown in FIG. 5, portions of the drawing being broken away to show certain working parts thereof;

FIG. 9 is a side view of the meter taken from the right side of FIG. 8;

FIG. 10 is an enlarged detail view taken along the line 10—10 of FIG. 8; and

FIG. 11 is a schematic diagram of the meter control system.

Figure 2:
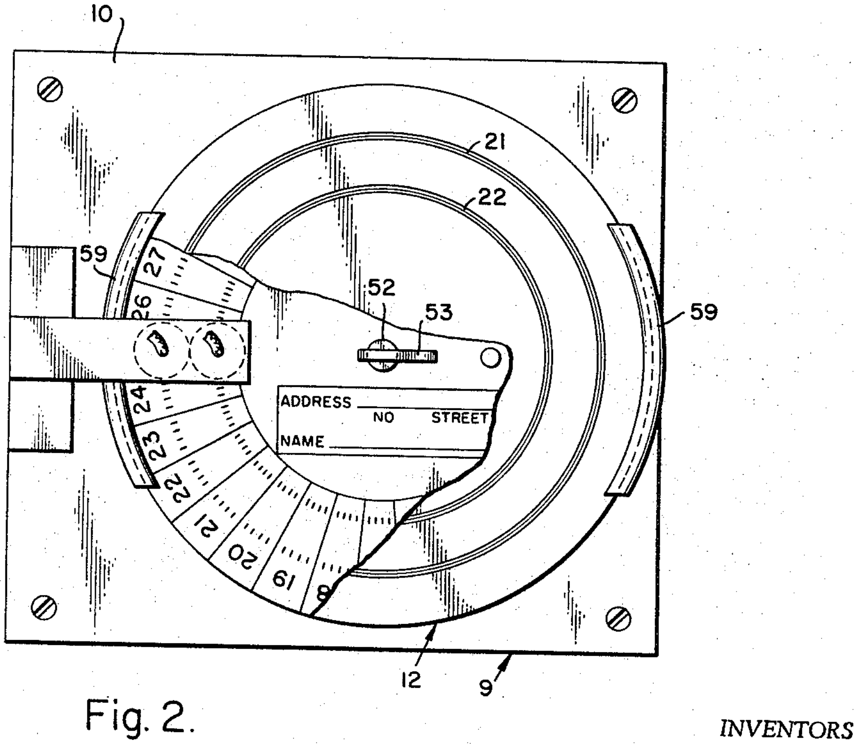
FIG. 2 is a plan view of the meter of FIG. 1 with a portion of a charge card depicted therewith to illustrate its cooperation with the platen of the meter.

Before considering the details of the subscription television meter as illustrated in FIGS. 1–3, it is best to consider the functional organization of the components (FIG. 4) to understand how they cooperate with each other and in connection with the pay television system disclosed in my co-pending application, Ser. No. 106,799. A diagram similar to FIG. 4 is depicted as FIG. 1 of the above identified application.

The meter 9 includes a frame 10, a rotatably mounted platent or table 12, a ratchet mechanism 13 for rotating the platen in response to remote signals from a main station and, in the exemplary embodiment illustrated, a pair solenoids 14 and 15 that have axially movable armatures 17 and 18, respectively, which are adapted to perforate a charge card supported on the platen 12. The top of the table or platen 12 has formed in it a pair of circular grooves 21 and 22 which respectively underlie the perforating end of armatures 17 and 18 of the electromechanical devices 14 and 15. Operation of one of the devices 14 or 15 causes the armature associated therewith to move down towards the top of the table to extend its end below the edge on the groove with which it is associated. This movement perforates a charge card disposed on the top of platen 12.

The ratchet mechanism 13 includes a stepping or ratchet relay 25 and a ratchet 26. Operation of relay 25 (by an external source from the main station) causes the armature of relay 25 to close thereby rotating the ratchet 26 to advance or rotate the table 12 approximately 2.8125 degrees, which works out to be 128 integral incremental steps per revolution of the platen 12.

Looking to the operation of the meter 9 in conjunction with the pay television system described in the above-identified referenced application, a switch in the receiver-converter circuit of the pay television system, represented by switch 27 of FIG. 4, is closed whenever the platen 12 is to be advanced, with the result that a source of power 30 is connected over the back contact or relay 25 and through its coil to ground. This energizes relay 25 and causes its armature to close and advance platen 12 one increment. The exemplary switch 27 is closed each time the group of programs transmitted over the closed wire system to subscriber stations is changed.

Once the programs are changed and the fact duly noted by rotating the platen or table 12 to a unique position corresponding to the programs then being transmitted to subscriber stations, the selection by a subscriber of one of the two pay television program channels, by closure of exemplary switch 28 or 29, energizes the solenoid 14 or 15 associated therewith. The armature associated with the energized solenoid moves downward to perforate the charge card on a circular path unique to that particular pay television channel. It should be apparent that, while two pay television program channels may be marked by the exemplary meter illustrated, it is possible to form additional circular grooves or paths at different radii in the upper surface of the platen 12 to permit the marking of a card for one of three or more pay television programs.

With the use of the meter 9 in a typical pay television system understood, it is next possible to consider the structural arrangements of the parts which effect the desired results. The meter 9 includes a frame or base member 10 having an upstanding L-shaped bracket 11 affixed to one side which acts to support the solenoids 14 and 15 in positions overlying their respective grooves 21 and 22 in the platen or table 12. An upstanding shaft 52 is affixed to the frame 50 and acts to rotatably support the platen 12. A locking device 53 is pivoted at 54 in the upper end of shaft 52 so as to maintain a charge card, partially illustrated as 4, on the top of the platen 12 during operation of the meter.

The platen 12 is also given peripheral stability by an upstanding circular support ring 56 fixedly attached to the upper surface of frame 50 with its center coinciding with the longitudinal axis of shaft 52. The platen 12 is formed in the shape of a cup or a flat table top with a circular flange 57 formed at its outer circumference and depending downwardly at right angles towards and cooperating with said stabilizing ring 56. The upper surface of the ring 56 has a groove 58 formed therein to engage the edge of the flange 57 to permit the platen 12, as it is rotated by the ratchet means 13, to be guided by the sides of the groove 58.

The table top 12 also has a pair of oppositely disposed arcuate retaining lips 59 attached to its outer edge or flange 57 which permit the charge card 4 to be slipped thereunder and held firmly against the face of the platen 12. The circular grooves 21 and 22 formed about the top of the platen 12 are most clearly illustrated in FIGS. 1 and 2. It can be seen from FIG. 1 that the electromechanical solenoids 14 and 15 are supported by the L-shaped member 11 to overlie grooves 21 and 22 so that upon energization, their respective armatures 17 and 18 can move in a downward direction towards the top of the table 12 to perforate a charge card.

As can be seen best in FIGS. 1 and 3, the interior of the flange 57 has teeth formed about its circumference much as an annular gear and cooperates with the ratchet mechanism 13 to advance the platen or table 12 an incremental 2.8 degrees upon each operation of the ratchet or stepping relay 25. While it cannot be determined from FIGS. 1 and 3, the number of teeth on the annular gear 61 is 128, which number provide the 2.8 degrees advancement upon each operation of the ratchet mechanism 13.

The ratchet mechanism 13 may be most clearly seen as it cooperates with the annular gear 61 in FIG. 3. The mechanism 13 includes the electromagnetic relay 25 having an armature 62 pivoted at a knife edge 63. A spring 64 acts to urge the armature to its released position, separated from the pole face 65, during the time of the coil of the relay 25 is de-energized. The armature 62 is L-shaped and the leg remote from the pivot point 63 has attached thereto or engages contact 1 associated with relay 25 so as to displace it or separate it from contact 2 when relay 25 is energized.

A ratchet finger 68 is affixed to the L-shaped armature 62 so that movement of the armature into contact with the pole face 65 causes the free end 69 of the finger 68 to engage one of the inter-tooth grooves on annular gear 61. A stabilizer 71 is affixed to the bottom part of the platen 12 to act as a stabilizing device for the finger 68 during its operation and an anti-reverse assembly 72 is also attached to the underside of the platen 12 to prevent counter-rotation of the platen 12. The latter includes finger 73 which engages a tooth two removed from that of the pick-up finger tip 69 to prevent pick-up finger 68 from engaging or skipping more than one tooth on gear 61 responsive to each operation of relay 25. Also provided to cooperate with the relay 25 is an armature back stop adjustment 76, adaptable to set the amount of movement of the pick-up finger 68 during operation.

Referring now to FIGS. 5–11 there is shown as a modification of the present invention a meter 109 which includes a frame 110 in which is rotatably mounted a table or platen 112 for supporting a record card 104. A platen driving mechanism 113 is mounted on frame 110 for advancing the platen. Also mounted on frame 110 are a pair of solenoids 114 and 115 having respectively associated therewith pivotally mounted armatures 117 and 118. Attached to armatures 117 and 118 are punch members 117*p* and 118*p*, respectively, which causes perforation of the charge card when the respective solenoid is energized.

Platen driving mechanism 113 includes a solenoid 125, energization of which effects operation of the platen driving mechanism to rotatively advance the platen one step on actuation of a circuit 127 which responds to a reversal of D.C. polarity caused at the studio. That is to say each time the polarity on the transmission line is reversed, circuit 127, as will be described in more detail hereinafter, causes energization of solenoid 125 to advance the platen 112 to a new position.

Each subscriber station is provided with a control unit C which includes inter alia, push button switches 128 and 129 for effecting operation of solenoids 114 and 115, respectively. A subscriber desiring to view either of the pay program signals need only push one of the push buttons 128, 129 to effect his selection and such selection will be recorded on record card 104 by virtue of punch members 117*p*, 118*p*.

Platen 112 is rotatably mounted on a shaft 152 which extends from frame 110. A projection 153 is provided on the surface of platen 112 for registering with a hole in record card 104 to position the charge card with respect to the table. Associated with punch members 117*p* and 118*p* are spring clips 154 which serve to maintain the charge card on the surface of platen 112 during operation of the platen and the punch members.

Table 112 is formed on the periphery thereof with equally spaced teeth 161 for enagement by platen driving mechanism 113. Referring to FIGS. 5 and 6, platen driving mechanism 113 may be seen to include an armature 162 pivotally mounted with respect to solenoid 125 to be attracted thereby upon energization of the solenoid. Armature 162 is biased to its release position by a coil spring 164 affixed at its inner extremity to frame 110. The armature has a generally L-shaped extension 165 which extends downwardly toward frame 110, and extends through an opening 166 in a pivotally mounted arm 168. Extending from arm 168 is a resilient finger 169 which engages teeth 161 on platen 112 to effect rotary advancement of the platen. Underlying finger 169 is an anti-reverse finger 172. It will be seen that on energization of solenoid 125 and consequent attraction of armature 162 toward the solenoid, finger 169 is moved away from teeth 161, and that on de-energization of the solenoid, spring 164 causes armature 162 and leg 165 to move finger 169 so as to advance table 112.

In the present system, a coaxial cable 202 is installed between a central studio and one or more subscriber stations. By way of example, three program signals can be employed in the system, two channels, hereinafter denominated "A" and "B," are provided with pay programs, and one channel, hereinafter denominated "P," is provided with a preview program signal which the subscriber may watch at no cost. It is preferred to modulate the program signals on discrete subcarriers for transmission over the cable. For example, in one system, channel A is modulated on a carrier having a center frequency of approximately 22 mc., channel B is modulated onto a subcarrier having a frequency of approximately 29 mc., and the preview channel is modulated on a subcarrier having a central frequency of approximately 36 mc. Each subscriber station is provided with a local oscillator-mixer 204 which is provided with a three position rotary wafer switch for selecting the appropriate local oscillator output frequency, such switch being schematically designated at 206. Local oscillator-mixer 204 may, by way of example, be a conventional circuit which converts the signal on cable 202 to a frequency at its output 205 suitable for detection on an unused channel on receiver 209. For example, channel 6 in which video is centered at 83.25 mc. and audio is centered at 87.75 mc. can be used. Obviously, any other frequency may be used depending on which channel is unused by regular commercial television in the particular geographic area of operation. Also provided in meter 109 is an antenna switch 208 for switching the antenna terminals on the subscriber's television receiver 209 between the subscriber's conventional antenna 209*a* and the coaxial cable output 205 from local oscillator 204. Switch 208 is preferably a rotary switch driven by a shaft 210 and is of a conventional wafer type wherein contacts are spaced at 30° steps. The switch is arranged so that each 30 degrees of movement of the switch causes the connection to the television receiver antenna input terminals to alternate between the subscriber's antenna 109*a* and co-axial cable 205 from oscillator-mixer 204.

Mounted in driving relation to rotary switch 206 is a shaft 212 which shaft serves to position switch 206 to set oscillator-mixer 204 so as to demodulate any one of the program signals from cable 202. Switch 206 is arranged to establish a local oscillator frequency of a value to demodulate the preview program signal when the switch is in a central position. Shaft 212 has a flattened surface portion 214 thereon corresponding to the central position of switch 206. As may be seen in FIG. 5, armature 162 is mounted with respect to surface portion 214 so that when table advance solenoid 125 is energized, shaft 212 is restored to the center position as table 112 is advanced. On opposite sides of the central position of switch 206, the switch is arranged to demodulate pay channels A and B. Shaft 212 is provided with a surface portion 216 associated with the setting of rotary switch 206 corresponding to channel A and with a surface portion 218 associated with the position of switch 206 corresponding to channel B. Armature 118 is provided with an extension overlying surface portion 216 so that when solenoid 115 is energized, the armature extension contacts surface portion 216 and moves the surface portion into parallelism with the armature so as to position switch 206 for selection of channel A viewing. Armature 117 has a similar extension overlying surface portion 218 so that upon energization of solenoid 114 shaft 212 positions switch 206 for selection of channel B viewing.

From the foregoing it may be seen that energization of, for example, solenoid 115 draws armature 118 toward the solenoid and position shaft 212 by cooperation of armature 118 and surface portion 216, to select channel A for viewing on the subscriber's receiver. Simultaneously with such action, punch 118P pierces card 104 to give a permanent record of the subscriber's selection. It will also be observed that on termination of the pay program, energization of solenoid 125 will draw armature 162 toward the solenoid and will restore oscillator-mixer 204 to a central position wherein the preview signal is applied to receiver 209. Such action comes about by cooperation of armature 162 with surface portion 214 on shaft 112.

Provisions are also made for allowing the subscriber to return from either of the pay program signals to viewing either the preview channel or regular commercial television. For this purpose a solenoid 220 is mounted on frame 110 adjacent shaft 212 and has associated therewith an armature 222 having an extension which overlies surface portion 214 of shaft 121. Thus energization of solenoid 220 will draw armature 222 toward the solenoid and will also restore shaft 212 to the central or preview position.

Push button control unit C is provided with a push button 224 for operation by the subscriber in restoring the system from either of pay channels A and B to the preview channel, and with a push button 226 for use by the subscriber in returning to regular commercial television viewing. For convenience of description push button 224 will be referred to as the preview or "P" button and push button 226 will be referred to as the regular or "R" push button. One side of push button "P" is grounded, the other side extending to a moving contact 228C of a wafer switch secured to shaft 212. Such wafer has a pair of fixed contacts 228A and 228B which are contacted by contact 228C when shaft 212 is in the A position or B position, respectively. Thus when either pay program signals A or B are selected and the subscriber desires to return to preview he need only depress push button 224 which establishes a ground path to solenoid 220, the other side of which is connected to the 20 volt DC signal on co-ax cable 202. Depression of push button P when shaft 212 is in the central position will have no effect on the operation of the system because no circuit is established by contact 228C.

Also affixed to shaft 212 is a wafer switch having a moving contact 230C and a fixed contact 230P which contacts close a circuit only when shaft 212 is in the central or preview position. The "R" push button 226 has one side grounded and the other side connected to fix contact 230P. A wafer switch having a moving contact 232C is connected to shaft 210 and has associated therewith a fixed contact 232P corresponding to the pay position of shaft 210 and a fixed contact 232R corresponding to the regular position of shaft 210. When the system is in the pay position and the subscriber desires to return to viewing of regular commercial television, depression of push button 226 establishes a ground path through contacts 230P, 230C, 232P and 232C to one side of solenoid 220, the other side of which is connected to the DC potential on co-ax cable 202.

Should the subscriber inadvertently press the "R" button when either pay channels A or B are selected the condition of the meter will be unaffected because the circuit between contacts 230P and 230C will be broken in such condition. Therefore the system includes an electrical interlock which requires that the subscriber return to preview viewing from pay viewing before returning to regular commercial television. Moreover, for preventing a subscriber from inadvertently selecting a pay program and therefore marking card 104 unintentionally, there is provided in push button unit "C" an interlock push button 234 which must be pressed by the subscriber concurrently with either push button A or B to operate solenoid 114 or 115.

In order to preclude a subscriber from switching directly from pay channel A to pay channel B and to require at least momentary viewing of the preview channel, a wafer switch having a moving contact 236C and a fixed contact 236P corresponding to the central or preview position of shaft 212 is provided. The 20 volt DC signal from co-ax cable 202 is applied to solenoids 114 and 115 through the circuit established by contacts 236P and 236C, as a consequence of which neither solenoid can be energized unless the shaft 212 is in the central or preview position. DC power supplied to solenoids 114 and 115 is also conducted through a wafer switch secured to shaft 210 which wafer switch includes a moving contact 238C and a fixed contact 238P. Thus only if shaft 210 is positioned to connect oscillator-mixer output cable 205 to the antenna terminals on receiver 209 can either of the pay channels be selected for viewing. Accordingly, the likelihood of false punches on card 104 is materially reduced.

Although the switches secured to shaft 210 are shown schematically in FIGURE 11 as single pole double throw switches it is to be understood that the respective fixed contacts associated with each moving contact are mounted in alternation on a wafer switch. Conventionally a rotary wafer includes a moving contact centrally thereof and 12 contacts spaced around the periphery thereof for sequential connection by the moving contact. The switches connected to shaft 210 are of such type and every other fixed contact on the respective wafers is associated with the "R" or regular position of shaft 210 whereas alternate fixed contacts are associated with the "P" or preview channel. Because teeth 242 on ratchet wheel 240 are 12 in number and are equally circumferentially spaced around the periphery of the wheel, each alternate step of shaft 210 will switch the contacts associated with the shaft between the pay position and the regular position.

It will be noted that shaft 212 is positioned identically when the subscriber is viewing either regular television or the preview program signal, the only difference in the system being the connection through switch 208 of the antenna terminals of the subscriber's receiver. The position of shaft 210 is controlled by a ratchet wheel 240 having a plurality of teeth 242 spaced around the periphery thereof and being angularly separated from one another by an amount equal to the angular difference between the fixed contacts of the wafer switches secured to shaft 210, typically 30°.

A link 244 having a pawl 246 engageable with teeth 244 is mounted for sliding movement with respect to frame 110 by a bifurcated extension 248 in embracing relation to a headed pin 250 affixed to frame 110. Link 244 additionally includes a stop tang 249 which limits pivotal movement of the link and limits rotary advancement of ratchet wheel 240 to exactly 30° each time pawl 246 contacts a tooth 242. A spring 252 is provided for biasing link 244 radially toward ratchet wheel 240. Link 244 is provided with a generally semi-circular aperture 254 through which shaft 212 extends. The shaft is formed with a diametral surface portion 256 which bears on the base of semi-circular aperture 254 and limits the movement of link 244 toward ratchet wheel 240 caused by spring 252. Link 244 is also provided with a generally L-shaped aperture 258 through which extends a lateral extension 260 of armature 222.

Referring now to FIGURE 7B wherein shaft 212 is in the central or "preview" position it will be seen that the surface portion 256 of shaft 212 permits the link to be urged rightwardly as viewed in the figure, so that upon energization of solenoid 220, armature extension 260 will engage the notch portion of L-shaped aperture 258 thereby moving pawl 246 generally tangentially with respect to ratchet wheel 240 and into engagement with teeth 242 to advance the antenna switch 208 by one step. It may thus be seen that when a subscriber is viewing the "preview" channel and desires to return to regular television he need only depress the "R" button so as to energize solenoid 220 and effect movement of shaft 210 through the link and pawl as last described. In FIGURE 7A, shaft 212 is seen positioned for viewing one of the pay program signals. Shaft surface portion 256 bears against the base of aperture 254 so as to move link 244 leftwardly as viewed in the figure, as a consequence of which armature extension 260 will move in the slot portion of L-shaped aperture 258. Therefore, the link will experience little or no pivotal movement on energization of solenoid 220 and consequently ratchet wheel 240 will not be contacted or rotated by pawl 246. Thus it may be seen that when the system is returned from either of the pay program signals by energization of solenoid 220 through depression of push button 224, shaft 212 is restored to the central or "preview" position but shaft 210 is not rotated. The subscriber is thereby given an opportunity of viewing the preview channel after viewing one of the pay channels so as to enable him to determine whether he desires to observe the other pay channel or to return to regular commercial television. Should the subscriber elect the latter he can depress push button 226 to again energize solenoid 220 and advance antenna switch 208 through link 244 as depicted in FIGURE 7B.

At the conclusion of a pay program it is desirable that all subscriber's receivers be returned to the preview channel. As discussed above, such return is effected from the studio by energization of solenoid 125 which advances platen 112 and centers shaft 212 to restore switch 206 to the central or "preview" position. Simultaneous energization of every meter on a given cable 202 would impose a prohibitively excessive current load on the cable. For that reason, circuit 127 includes a capacitor 262 in series with a resistor 264 connected to cable 202. Capacitor 262 is therefore charged gradually and current drain from the cable is limited by resistor 264. Circuit 127 functions to afford a discharge path for capacitor 262 through solenoid 125 on reversal of polarity of the DC potential on cable 202. For this purpose, and assuming that the center conductor of cable 202 is normally positive with respect to the shield on the cable, one side of solenoid 125 is connected to ground through a normally back biased transistor 266 which in the exemplary circuit of FIGURE 11 is a PNP transistor. A second transistor 268, an NPN transistor, is provided for controlling the base of transistor 266. In the normal polarity condition, that is with the center conductor of cable 202 positive with respect to the shield, the base-emitter junction of transistor 268 is back biased through a resistor 270 and a diode 272. The emitter-base junction of transistor 266 is normally back biased through a resistor 274. When the polarity of the DC signal on cable 202 is reversed at the studio, the base-emitter junction of transistor 268 is forward biased as a consequence of which the collector of that transistor conducts so as to lower the potential on the base of transistor 266 and to switch the latter transistor to a conductive state. Therefore capacitor 262 is discharged to ground through solenoid 125 and transistor 266, and armature 162 (FIGURE 5) is attracted toward the solenoid. Consequently, shaft 212 is restored to the central position and on the release of armature 162, spring 164 urges pawl 169 into driving engagement with teeth 161 on platen 112 to advance the billing card one increment.

Thus it will be seen that the present invention provides apparatus for giving effect to a subscribers' program choice and for permanently recording such choice for billing purposes. The apparatus has suitable interlocks to require that the subscriber views the preview program between changes from regular commercial television to one of the pay television programs or between the two pay programs. Such interlocks are beneficial to the subscriber in that unintentional charges are avoided and the subscriber is given the opportunity to view coming attractions, and is advantageous to the operator of the system in that each subscriber is repeatedly exposed to information relating to current and future programs. Additionally, the apparatus is so arranged that the record card can be periodically changed without entry to the subscribers' premises or without interruption of the subscribers' television viewing.

While several embodiments of the present invention have been shown and described, it will be apparent that other adaptations and modifications can be made without departing from the true spirit and scope of the invention.

What is claimed is:

1. Apparatus for selecting any one of three video signals modulated on three unique carriers transmitted on a transmission line to afford viewing of the selected signal on a television receiver comprising a local oscillator-mixer for selectively demodulating one of said video signals, said oscillator-mixer including a rotary switch having a discrete position for each signal, a shaft attached to said switch for controlling the rotary position thereof, said shaft including three axially spaced apart surface portions, one said surface portion being associated with each said switch position, a solenoid coil associated with each said video signal, an armature associated with each solenoid and responsive to energization of the solenoid to physically contact a respective shaft surface portion and move the contacted surface portion into substantial parallelism with a respective said armature so as to position said switch at one of said rotary positions, and means for affording selective energization of said solenoids.

2. In a pay television system of the type in which three video signals are modulated on three discrete carrier signals and conveyed over a transmission line to a plurality of subscriber stations, and in which each subscriber station is provided with a conventional television receiver and a local oscillator-mixer having a three position rotary switch for effecting selection of one of said video signals for viewing on the subscriber's television receiver, improved apparatus for controlling said rotary switch to effect selection of one said video signals for viewing and for permanently recording a subscriber's selection said apparatus comprising a shaft rotatably mounted in driving relation to said switch, said shaft having a flat surface portion thereon associated with each video signal, a solenoid associated with each said surface portion, a pivotally mounted armature associated with each said solenoid and extending in overlying relation to respective surface portions of said shaft, each said armature being arranged to contact the shaft surface portion with which it is associated upon energization of its associated solenoid so as to move said switch to a position at which one of said video signals is selected for viewing, a punch member extending from at least one of said armatures, means for supporting a record card in spaced relation to said punch so that a card supported by said supporting means is punched on energization of the solenoid associated with the armature from which said punch extends, and means responsive to a control signal on said cable for selectively advancing said record card supporting means.

3. In a subscription television system wherein a preview program signal and two pay program signals are each modulated on a discrete subcarrier and are transmitted to at least one subscriber station on a single transmission line and wherein subscriber station is provided with an antenna and a conventional television receiver having antenna terminals for connection of said antenna to said receiver, the combination of means for selectively demodulating each of said program signals on said transmission line, a three position rotary switch for controlling said demodulating means to afford selection of the program signal demodulated by said demodulating means, means including a main control shaft attached to said rotary switch for affording selection by a subscriber of a desired one of said program signals, a rotary antenna switch for alternately connecting said transmission line and said antenna to said receiver antenna terminals, said antenna switch being adapted to rotate in discrete steps with each step connecting the antenna terminals alternately to the antenna and to the transmission line, a ratchet wheel attached in driving connection to said antenna switch, said ratchet wheel having a tooth associated with each said step, a link including a pawl for drivably engaging said ratchet wheel, said link being apertured remote from said pawl for circumscribing said main shaft, means biasing said link radially toward said ratchet wheel, said main shaft having a cam surface cooperating with said aperture to move said pawl radially away from said ratchet wheel against said biasing means when said main shaft is positioned to demodulate either of said pay program signals, means actuable by the subscriber for rotatably moving said main shaft to the preview signal position thereof, and means responsive to said main shaft moving means for moving said pawl tangentially toward said ratchet wheel so that when a subscriber actuates said main shaft moving means said antenna switch is operable to connect the subscriber's antenna to the receiver only if the main shaft is positioned for demodulating the preview program signal.

4. In a television system of the type wherein a free preview program signal and a pair of pay program signals are modulated on respective subcarrier frequencies and transmitted over a single transmission line to a plurality of subscriber stations and wherein each subscriber station is provided with a local oscillator-mixer to selectively detect one of the signals which oscillator-mixer includes a three-position rotary switch to effect selection of one of the signals, improved apparatus for permitting the subscriber to select any one of said signals and for establishing a permanent record of selection of either of the pay program signals comprising a shaft mounted in driving connection to said rotary switch, said shaft having three surface portions thereon, each said surface portion being associated with a different position of said rotary switch, a plurality of solenoids fixedly mounted with respect to said shaft, each of said solenoids being associated with each said surface portion, each said solenoid having an armature movable toward and away therefrom in response to energization of the solenoid, each said armature including an extension overlying the associated shaft surface portion to rotatively position said surface portion into parallellism with said armature in response to energization of said solenoid and to position said rotary switch to demodulate one of said program signals, means including a push button switch associated with each said solenoid for affording selective energization of said solenoids to enable subscriber selection of one of said program signals, a punch member on each armature associated with each pay program signal for movement with the armature in response to energization of the associated solenoid, a record card, means for supporting said record card so as to be punched by said punch member when the associated solenoid is energized, and means for advancing said card in response to a control signal on said transmission line, said card advancing means including an armature overlying the shaft surface portion associated with said preview program signal so that said local oscillator is restored to demodulate the preview program signal when said card advancing means is operated.

5. In a subscription television system of the type wherein a preview program signal and two pay program signals are modulated on three discrete carriers and transmitted over a transmission line to a plurality of subscriber stations and wherein each subscriber station includes a conventional television antenna and a conventional television receiver having antenna terminals for affording connection of the antenna to the receiver, improved apparatus for enabling a subscriber to select for viewing regular television signals from said antenna and program signals from said transmission line and for recording the event of selection of one of said pay program signals comprising a local oscillator-mixer for selectively demodulating said program signals to a frequency of an unused channel, a rotary switch controlling said oscillator-mixer, said switch having a central position at which the preview program signal is selected and two lateral positions on opposite sides of said central position at which respective pay program signals are selected, a shaft for controlling the rotative position of said switch, said shaft having three surface portions formed thereon, one said surface portion corresponding to each said switch position, a pair of solenoids mounted opposite each of two of said shaft surface portion corresponding with each pay program signal and having an armature overlying the associated surface portion for rotatively positioning the shaft in response to energization of the solenoid, a punch member associated with each said armature, a record card, means for supporting said record card so as to be pierced by said punch member in response to energization of said solenoid, means responsive to an externally applied signal for advancing said card supporting means at the termination of a given pay program, said advancing means including an armature overlying the third shaft surface portion so that when said card is advanced the preview program signal is presented to the subscriber.

6. Apparatus for selectively advancing a rotary switch shaft comprising a ratchet wheel having a plurality of teeth affixed to said shaft, a link including a pawl engageable with the teeth on said ratchet wheel for rotatively advancing the wheel, means for mounting said link for radial movement with respect to said ratchet wheel, means for resiliently biasing said link radially toward said ratchet wheel, a portion of said link remote from said pawl defining a hole having a base edge facing said pawl, a shaft extending through said hole and being mounted for pivotal movement about an axis disposed medially of said base edge, said shaft having a cam surface substantially symmetrical of said axis and being cooperable with said base edge to retract said link radially from said ratchet wheel in response to pivotal movement of said shaft in either direction, and means for constraining said link so that said pawl moves substantially tangentially of said ratchet wheel.

7. In a pay television system wherein two pay program signals and a preview program signal are transmitted over a transmission line to a subscriber station that has a television receiver having antenna terminals and a television antenna for connection to the antenna terminals, improved control apparatus comprising a rotary wafer switch having a plurality of circumferentially spaced fixed contacts and a rotatively moving contact sequentially connectible to each of said fixed contacts, said rotatively moving contact being connected to said antenna terminals, every other said fixed contact being connected to said transmission line, the remaining fixed contacts being connected to said antenna, a ratchet wheel mounted in driving relation to said moving contact, said ratchet wheel having a plurality of teeth spaced about the periphery thereof in correspondence with said fixed contacts, a link having a pawl for engaging said teeth, means mounting said link for pivotal movement about an axis spaced from said ratchet wheel and for radial movement toward and away from said ratchet wheel, means for resiliently biasing said link radially toward said ratchet wheel, said link being formed with a bearing edge surface facing said ratchet wheel, a shaft having a flat cam surface contacting said link bearing edge surface, said shaft being pivotably mounted for rotative movement between a first position at which said link is in tangential alignment with said ratchet wheel and a second position at which said link is radially spaced from said ratchet wheel, a solenoid having an armature mounted in driving relation to said shaft for moving said shaft from said second position to said first position in response to energization of said solenoid, said armature having a lateral extension and said link having an opening therein for receiving said armature extension, said opening having a notch portion in which said armature resides when said shaft is in the first position and which notch is sufficiently narrow that when said armature is moved said pawl is driven tangentially toward said ratchet wheel to rotate said ratchet wheel, said opening having a slot portion in which said armature extension resides when said shaft is in said second position and which slot is sufficiently elongate that when said armature is moved said armature extension moves independently of said link and pawl.

References Cited

UNITED STATES PATENTS

| | | | |
|---|---|---|---|
| 2,081,686 | 5/1937 | Thomas | 334—19 |
| 2,839,173 | 6/1958 | Loew et al. | 346—50 |
| 3,051,775 | 8/1962 | Novak et al. | 346—37 |
| 3,157,737 | 11/1964 | Schlafly | 178—5.1 |
| 3,172,948 | 3/1965 | Rubinstein | 178—5.1 |
| 3,183,513 | 5/1965 | Swank | 346—78 |

RICHARD B. WILKINSON, *Primary Examiner.*

J. W. HARTARY, J. G. MURRAY, *Assistant Examiners.*